Dec. 9, 1930.  F. LANE ET AL  1,784,015
ARC WELDING APPARATUS
Filed April 3, 1929
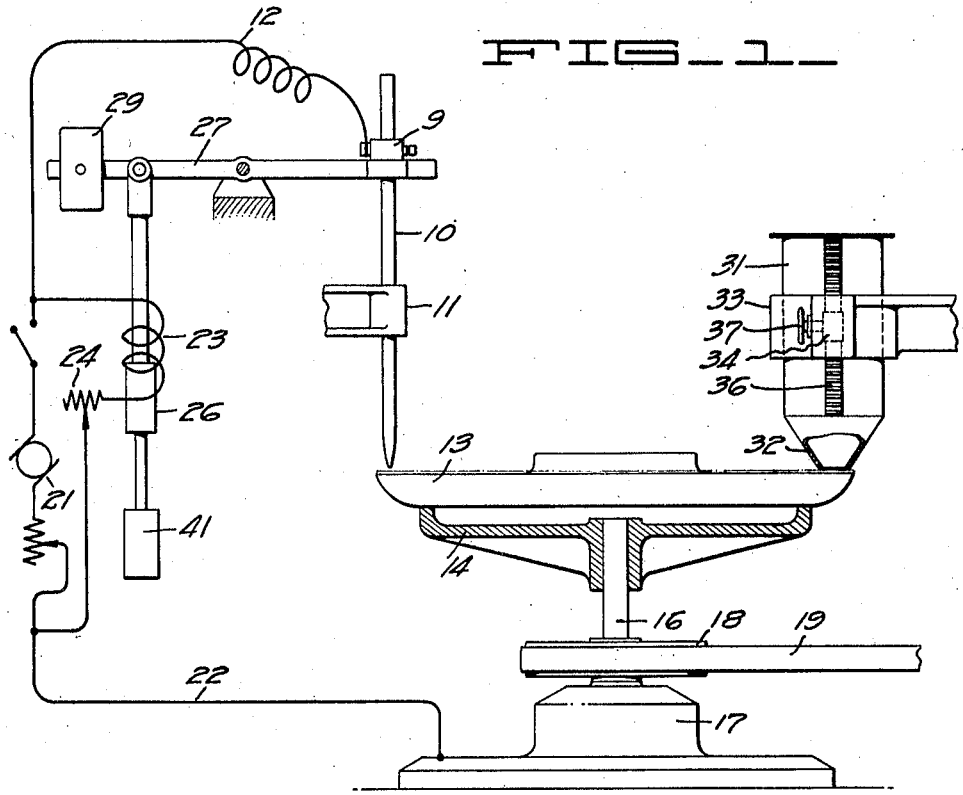
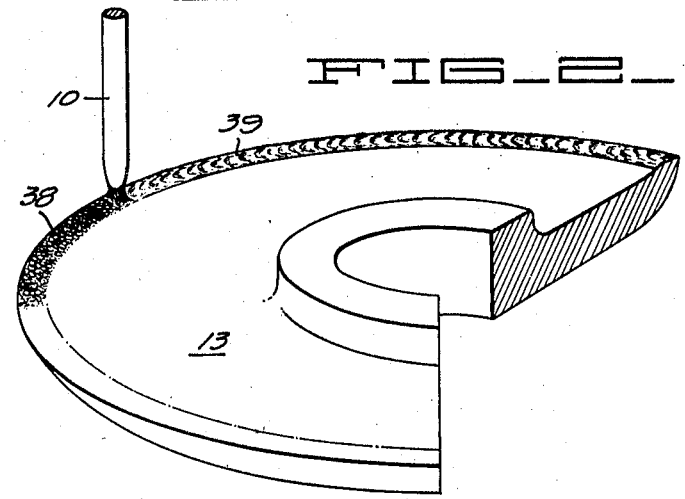
INVENTORS
FULTON LANE
HARRY J. MORGAN
BY
White, Prost & Fryer
ATTORNEYS Patented Dec. 9, 1930

1,784,015

UNITED STATES PATENT OFFICE

FULTON LANE, OF PALOS VERDES ESTATES, AND HARRY J. MORGAN, OF WALNUT PARK, CALIFORNIA, ASSIGNORS TO P. L. & M. COMPANY, OF LOS ANGELES, CALIFORNIA, A CORPORATION OF CALIFORNIA

ARC-WELDING APPARATUS

Application filed April 3, 1929. Serial No. 352,125.

This invention relates generally to electrical apparatus utilizing an arc for fusing metallic material to metal bodies. It is adapted particularly for applying hard metallic facing material to tools and other appliances.

It is a general object of this invention to devise apparatus of the above character which will facilitate maintenance of a proper fusing arc, and which can be used by relatively unskilled workmen.

It is a further object of this invention to devise apparatus automatic in character for fusing hard metallic facing material to metal bodies by an electric arc.

It is a further object of this invention to devise an apparatus for the repairing or manufacture of rotary drill cutters.

Further objects of the invention will appear from the following description in which we have set forth the preferred embodiment of our invention. It is to be understood that the appended claims are to be accorded a range of equivalents consistent with the state of the prior art.

Referring to the drawing:

In Figure 1 we have illustrated an apparatus and circuit controller incorporating principles of our invention.

Fig. 2 is a perspective view illustrating the manner in which the electric arc or arcs are employed for fusing a layer of granular facing material.

In applying metallic material to metal bodies by electrical arc welding, it has been common to utilize a common carbon electrode manipulated entirely by the operator. In order to secure uniform distribution of fused material, and to produce a good quality of finished product, it is apparent that the operator must be relatively skilled, since it is necessary to both manually adjust the length of the arc, and to traverse the arc along the face of the work. It is also apparent that in manually operated apparatus of this kind the quantity of work produced is necessarily limited, and considerable strain is placed upon the operator. In this invention we have devised means whereby facing material may be fused to a body by electrical arc in a more rapid and convenient manner, and without the operator paying particular attention to the length of the arc.

The preferred form of our invention shown in the drawing consists of a suitable arc electrode 10 which is generally a carbon rod or pencil. This electrode is slidably extended thru a suitable guide member 11, and has electrical connection thru a collar 9 with positive conductor 12 of an electrical welding circuit. It is intended that an arc be struck between one end of electrode 10 and the face of a body 13, to which fused material is to be applied. In the preferred form of our invention the body 13 is a disc cutter of a rotary earth boring drill, such as shown.

For suitably supporting body 13 and for effecting progression of the arc across the face of the body, we have shown suitable means consisting of a metallic rotatable table 14. For purposes of illustration this table is shown mounted upon a shaft 16, which shaft is journaled in the base member 17. For effecting rotation of table 14, we have shown suitable means such as a pulley 18 and power driven belt 19, the pulley being mounted upon shaft 16. A source of suitable welding current of relatively low potential has been represented by a welding generator 21, the negative conductor 22 of this generator being connected to base member 17, thereby making connection to the work 13.

We prefer to automatically adjust the length of the arc struck between electrode 10 and the work, and for this purpose we have shown diagrammatically a solenoid 23 having its terminals connected across the source of current, that is across the generator 21, in series with a suitable controlling resistance 24. The movable member 26 of this solenoid is suitably mechanically connected with the electrode 10 as by means of lever 27. Connection collar 9 rests upon one end of lever 27, while the other end is provided with a suitable adjustable counter-weight 29.

We prefer that the material to be fused to the body be of granular nature, and for feeding material of this kind in the form of a layer in advance of the arc, we have shown a suitable hopper 31, having a discharge spout 32 terminating in proximity with the upper face of work 13. Preferably the proximity of discharge spout 32 with respect to the face of the work can be adjusted, and for this purpose we have shown hopper 31 slidably supported by arm 33. Pinion 34 carried by the support arm engages a rack 36 secured to the hopper 31. By rotation of pinion 34 with the knob or other manually engageable member 37, the hopper can be raised or lowered to the desired position. As an example of suitable granular material which can be applied to the face of the body for fusing with the electric arc, we can utilize a tungsten containing material such as disclosed in copending application No. 299,636 filed August 14, 1928 in the name of Morgan.

In operating our apparatus, the work, such as the cutter 13, is placed upon the table 14 and this table is slowly rotated. Granular facing material, such as the facing material referred to above, is introduced into hopper 31, and the position of this hopper adjusted so that an even layer of the granular material is spread upon a peripheral portion of the cutter along the cutting edge. When the welding circuit from the generator 21 is open, solenoid 23 is deenergized, and counterweight 29 is adjusted in such a manner as to raise the electrode 10 from the work 13. Upon closing switch 25 to complete the welding circuit, full generator potential is applied to the solenoid 23, and this solenoid immediately lifts counterweight 29 and permits the electrode 10 to drop into contact with the work, at which instant an arc is struck.

Striking of the arc effects a substantial lowering of potential across the solenoid 23, so that the current flow thru the solenoid is decreased a sufficient amount to permit the electrode to withdraw from the work to a point of equilibrium at which the arc is of proper length. If the arc tends to increase beyond its normal value due to burning away of the electrode 10 or due to other causes, such as irregularities in the work, current flow thru solenoid 23 increases to lower the electrode. Conversely if the arc decreases below its normal length due to irregularities in the work, current flow thru solenoid 23 is correspondingly decreased to permit counterweights 29 to lift the electrode a certain amount. The result of such operation is to automatically maintain the arc at a substantial normal optimum length. Flattening of the arc electrode can be prevented by a suitable dash pot 41 or equivalent mechanism. The normal operating length of the arc can be controlled thru certain limits by varying the controlling resistance 24. As a layer 38 of granulated facing material reaches the arc, it is fused to the body by the electric arc to form a strip of relatively hard facing material, such as indicated at 39 in Fig. 2. Where an extremely hard facing is desired, one or more additional layers can be applied upon top of the first layer.

It is evident that our apparatus will permit the application of facing material by a relatively unskilled workman, at a relatively rapid rate compared with the application by ordinary manually operated welding apparatus. While we prefer to provide mechanical means for automatically traversing the arc over the face of the work, the automatically controlled electrode can be incorporated in a portable apparatus and can be advanced manually by an operator over the face of a stationary body. In such event the operator need only cause the arc to travel a desired path, and need pay no particular attention to the arc length. It is also apparent that in place of a single electrode, a plurality of automatically controlled electrodes can be provided so as to fuse a greater area of facing material.

We claim:

1. In a welding apparatus for fusing material to the face of a body, an arc electrode from which an arc can be struck to the face of the body, means for effecting automatic adjustment of the electrode to preserve a substantially constant arc length, means for causing the arc to progress along a predetermined path on the body, and means for applying a layer of granular fusible material to the face of the body along said path in advance of the arc.

2. In a welding apparatus for fusing hard facing material along the cutting edge of a rotary disc drill, an arc electrode from which an arc can be struck to the face of the cutter, means for effecting automatic adjustment of the electrode to preserve a substantially constant arc length, means for causing the arc to move relative to the cutter so that the arc progresses about the cutter adjacent the cutting edge of the same, and means for supplying a layer of granular fusible material in advance of the arc.

In testimony whereof, we have hereunto set our hands.

FULTON LANE.
HARRY J. MORGAN.